(No Model.)

W. J. WALKER.
CAR COUPLING.

No. 452,891.  Patented May 26, 1891.

Witnesses
C. H. Hollar.
L. L. Tracey.

Inventor
William J. Walker.
By his Attorneys
Higdon & Higdon

UNITED STATES PATENT OFFICE.

WILLIAM J. WALKER, OF ST. LOUIS, MISSOURI.

CAR-COUPLING.

SPECIFICATION forming part of Letters Patent No. 452,891, dated May 26, 1891.

Application filed March 30, 1891. Serial No. 386,964. (No model.)

*To all whom it may concern:*

Be it known that I, WILLIAM J. WALKER, of the city of St. Louis, State of Missouri, have invented certain new and useful Improvements in Car-Couplings, of which the following is a full, clear, and exact description, reference being had to the accompanying drawings, forming a part hereof.

My invention has for its object to provide a novel and simplified construction in that class of car-couplings known as the "Janney" type; and it consists in the devices and combination of devices hereinafter more fully described and claimed.

Figure 1:
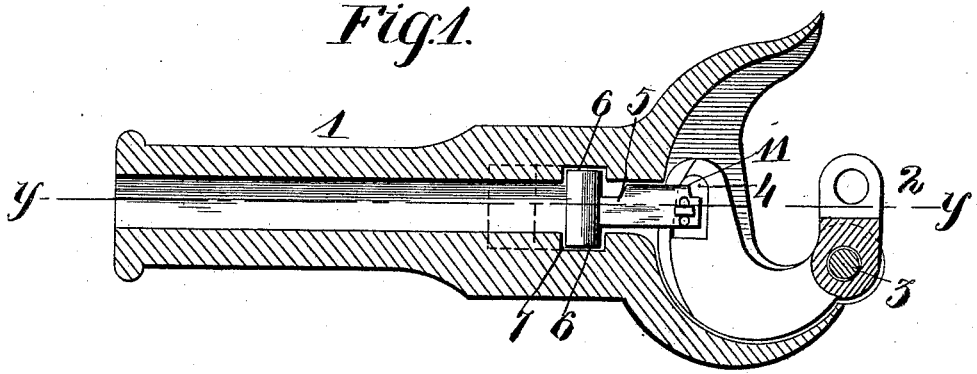
Figure 2:
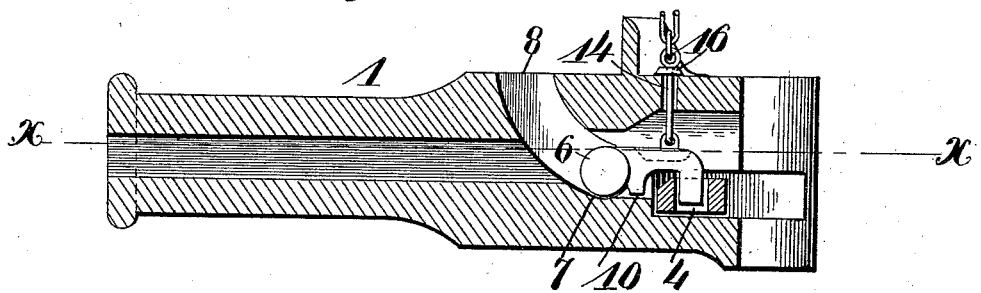
Figure 3:
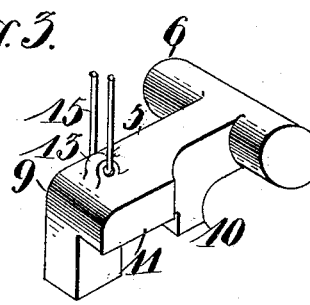
Figure 4:
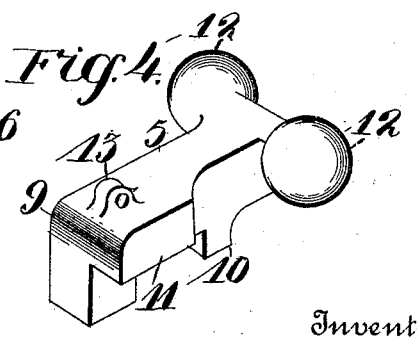

In the drawings, Figure 1 is a horizontal longitudinal section on the line x x, Fig. 2. Fig. 2 is a longitudinal vertical section on the line y y, Fig. 1. Fig. 3 is a perspective view of the locking device or hook, and Fig. 4 is a similar view of a modification of the same.

The object of the invention is to produce a coupling having greater strength in the locking device, which has necessarily been heretofore the weakest part in couplings of this character. Heretofore chains having small links have been attached to the locking device and extended above the upper surface of the coupling, which has been found objectionable for the reason that when the locking device is forced upward in the act of coupling, the chain will become slack and will be clamped between the locking device and the draw-head, and whereby said chains have been mashed and broken. This objection I overcome by attaching to the locking device or hook a bar or link of sufficient length to extend upward and above the upper surface of the draw-head, as will now be described.

Other improvements will appear farther on, whereby the coupling is strengthened in various places.

1 represents the draw-bar, the rear portion of which is of the usual construction, which portion is secured in the well-known manner to the car to which it is to be attached. The front or forward portion of said draw-bar in its outward appearance resembles that of the Janney type, and is designed to couple therewith when it becomes necessary.

2 represents the rotary hook, which is approximately of U shape, and is attached to the forward end of the draw-bar in a well-known manner—namely, by a vertical pin 3, which allows it to rotate between the ears of said draw-bar.

4 represents a slot or hole formed in the tail end of the rotary hook 2, which slot is adapted to receive the locking device when the said hook is in a closed position, as shown in Fig. 1, the operation of which will be hereinafter described.

5 represents the locking device or hook which I employ in carrying out my invention, and is of such a construction as to afford great strength.

6 represents two ears or extensions formed integral with the locking device 5, which ears are adapted to rest within the sockets 7 formed in the draw-bar, at the lower portion of the opening 8 formed in said draw-bar. The opening 8 is of curvilinear form; but other forms may be made in the draw-head—for instance, a vertical opening leading from the top of said draw-bar and extending a sufficient distance below the upper surface of the draw-bar to answer the purpose for which it is designed.

9 represents the forward extension or hooked end of the locking device, which portion is adapted to receive the slotted end of the rotary hook when the same is in closed position, as before stated. To the locking device 5 is also formed integral therewith a depending lug 10, which lug is shorter than the hooked end of the said device, and which is designed to rest upon a seat formed in the throat of the draw-head when the said locking device is in its normal position, by which means the same is always held in a proper position to be actuated upon by the rotary hook in the act of coupling.

Heretofore the strain upon the locking device has been in a longitudinal direction with the draw-bar, thereby giving but very little strength, and liable to become broken or disabled on account of its hook being formed at the forward portion thereof. This I obviate by providing the hooked portion of the locking device with an enlargement or increased portion 11, which portion bears against the vertical interior wall at the throat of the coupler when strain is brought to bear against the said locking device, thereby forming what I may term a "wedge," thereby bringing the strain against the solid portion of the draw-head.

By the use of ears formed upon the locking device I am enabled to dispense with a shaft which is commonly employed to attach the said device to the draw-head. However said shaft may be employed if found desirable in this case, the said shaft would extend through a hole formed for its reception in the locking device, the said shaft also extending through suitable holes formed in the draw-bar.

In Fig. 4 I have shown a modification of my locking device in which I dispense with the ears, as heretofore stated, and in their place substitute balls 12, which, if desired to be used, would necessitate corresponding sockets formed in the draw-head, and would thereby be termed a "ball-and-socket joint." In this modification the locking device would be inserted in the draw-head in a manner heretofore stated—namely, by inserting it from the upper surface of the same into the opening 8. To the upper face of the locking device or top thereof is formed a perforated extension 13, through which a bar or link is inserted for elevating the said locking device when it is desired to allow the rotary hook to be released.

14 represents a bar which extends above the upper surface of the draw-head when the locking device is in a locked position, the object of which is to bodily elevate the same when the said locking device is elevated in the act of coupling. This is substituted in place of the ordinary chain generally employed to elevate the locking device, which chain has been found objectionable, as heretofore stated. By this means it is impossible for the bar to become wedged between the locking device in the draw-head, as is usual in the case where the common chain is employed.

In place of the bar 14, as above described, I may substitute an elongated link 15, as shown in Fig. 3, which will answer the same purpose, and may be found preferable, and therefore can be used, if found desirable, it being only a mere difference in construction.

In Fig. 2 the vertical rod 14 is shown. In this instance I provide the same upon its upper end with a head or enlargement 16, which is designed to prevent water, dirt, and the like from passing into the opening formed in the draw-bar for the passage of said bar. To the upper end of the link or bar is attached the ordinary chain and releasing device which are common in all couplers of this character, and therefore needs no further illustration or description.

By preference I may form the opening 8 in a reversed direction, as shown in the drawings—namely, extending the same upward—the opening of which will be at the bottom of the draw-bar, and suitable seats formed at the termination of the opening for the reception of the ears of the locking device.

It is generally understood that the object in constructing couplers of this character is to form the same so as to stand the rough usage to which all car-couplers are necessarily subjected. This I have accomplished by the foregoing illustration and description.

Having fully described my invention, what I claim is—

1. A car-coupling consisting of a draw-bar, a rotary hook adapted to be secured thereto, and a locking device provided with ears adapted to be inserted within the said draw-bar through a suitable opening formed in the same, substantially as described.

2. In a car-coupler, the herein-described locking device provided with a hooked portion 9, ears 6, formed integral with the said locking device, and a depending lug or extension formed upon the lower surface thereof, substantially as described.

3. In a car-coupler, the combination of the draw-bar 1, the rotary hook 2, pivotally secured thereto, a slot or hole 4 formed in the tail end of the same, a locking device 5, having ears 6, an enlargement 11 formed integral with said locking device, and means whereby the said locking device is elevated in the act of uncoupling, substantially as described.

In testimony whereof I affix my signature in presence of two witnesses.

WILLIAM J. WALKER.

Witnesses:
  E. E. LONGAN,
  JNO. C. HIGDON.